May 19, 1970     O. W. SURINE ET AL     3,512,460
CERAMIC CHIPS AND METHOD
Filed Nov. 24, 1967
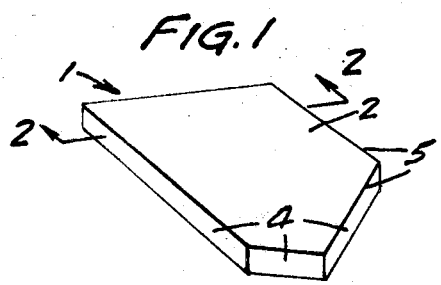
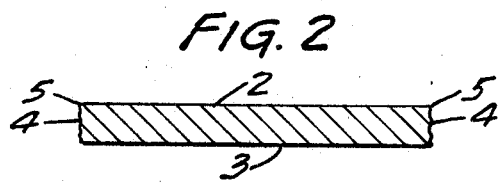
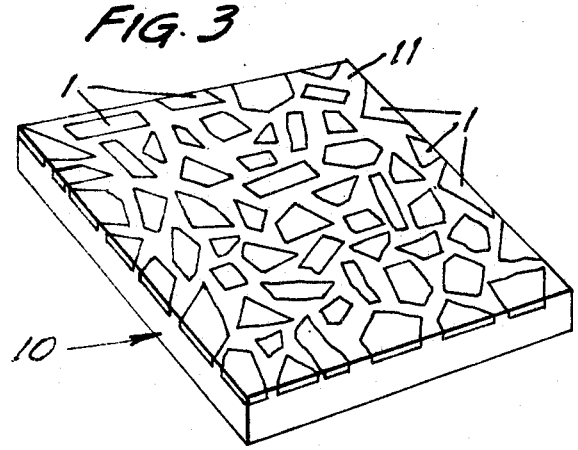
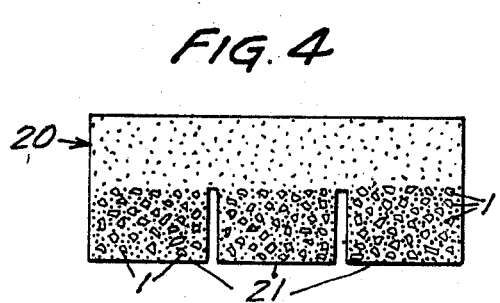
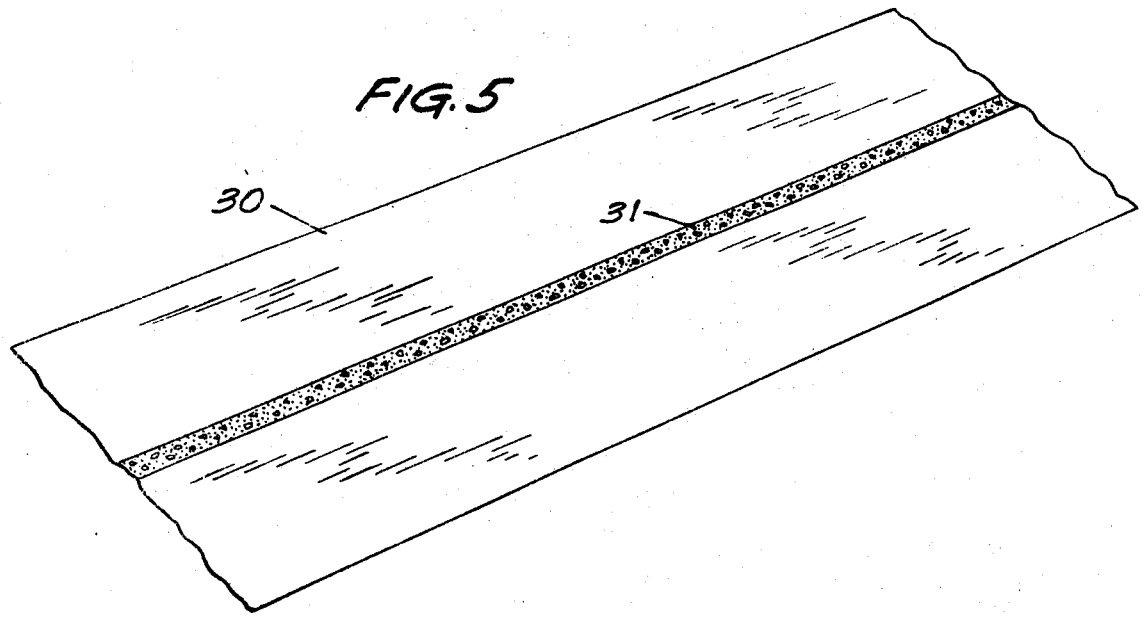
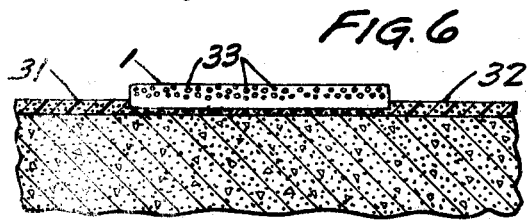
INVENTORS
OAKLEY W. SURINE
HENRY L. WEISBECKER
BY Carpenter, Kinney & Boulter
ATTORNEYS 3,512,460
CERAMIC CHIPS AND METHOD
Oakley W. Surine, Maplewood, and Henry L. Weisbecker, St. Paul, Minn., assignors to Minnesota Mining and Manufacturing Company, St. Paul, Minn., a corporation of Delaware
Continuation-in-part of application Ser. No. 497,203, Oct. 18, 1965. This application Nov. 24, 1967, Ser. No. 701,022
Int. Cl. E01c *11/24*
U.S. Cl. 94—5                         9 Claims

ABSTRACT OF THE DISCLOSURE

Dense flat fired ceramic chips formed from 40 to 60% feldspar and 40 to 60% clay, useful for floor inserts, etc., formed by extrusion, drying, breaking and then firing by continuously tumbling in rotary kiln at 1100° C. to 1350° C.

---

This application is a continuation-in-part of our copending application Ser. No. 497,203 filed Oct. 18, 1965, now abandoned.

This invention relates to a method for producing novel ceramic articles. More particularly the invention relates to the formation of dense vitrified flat chips utilizing a firing step in which the articles are maintained in a state of tumbling motion.

Ceramic chips have been used for various applications such as in the production of terrazzo tile. For example, in Tone Pat. 1,629,185, issued May 17, 1927, tiles are shown employing chips which are formed by molding, firing, and then crushing ceramic slabs. The chips of the Tone patent contain abrasive particles in order to provide a non-slip surface, but as a result the composition is not extrudable in any practical sense, and the final product is porous and sharp edged due to having been broken after firing. Prior to the present invention it was not envisioned that such chips could be fired subsequent to breaking in any commercially practical way.

It is an object of the present invention to provide a novel method for rapidly forming dense, fired ceramic chips of very low porosity which have light weight in proportion to the visual surface area thereof. The chips produced by the present invention are similar to irregular shaped segments broken away from a flat ceramic article, but having a high density and having sharply defined yet dulled edges such that the danger of cutting one's fingers during the course of handling the chips is substantially eliminated. Although the chips of the invention are dense and vitrified, they have a non-glassy appearance which strikingly resembles dense natural stone. In accordance with this invention it has been discovered that a narrow range of proportions of clay and feldspar is suitable for producing formulations which are both extrudable and capable of being fired to a dense, attractive-appearing state during tumbling motion in a rotary kiln.

The chips of the present invention may be applied to one surface of a terrazzo tile or floor to produce a surface which may be smoothed off with a minimum of grinding and with ease since they contain no coarse abrasive material. In a further end use application, the chips of the present invention may be used on asphalt roofing shingles in combination with conventional roofing granules to provide shingles having a pleasing rough textured appearance. A further advantage is that a roof constructed from such shingles appears monolithic because the lines separating the individual shingles do not stand out as in the case of conventional shingles. In a further embodiment terrazzo-like tile having a thickness of a single layer of chips is provided.

The chips of the present invention also provide a unique material for application to highway center lines and other markings. In such applications the chips will normally be made of a light color, are adhered to the highway surface using a suitable adhesive to provide durable soil resistant surface areas resistant to wear caused by vehicular traffic, and present a larger visible surface area than materials previously used in such applications. The chips intended for such use can be coated, for example, by spraying, with reflective glass beads to provide reflectorized vertical viewing surfaces on the edges thereof which are protected from vehicular wear.

The present invention provides a unique method of forming ceramic articles which is readily adaptable to low cost mass production. Previously flat ceramic articles, such as plates, tiles, and the like, were formed by supporting the same by various means during firing. The method of the present invention permits the firing at temperatures greater than those possible when the articles are in static contact with each other or with a support. Therefore, greater density than was hitherto possible in flat ceramic articles can be achieved in forming the chips of the present invention. Surprisingly the chips are not distorted when processed in accordance with the method of the present invention, even though they are continuously tumbled during the firing step.

It has been discovered that a critical range of proportions of ceramic ingredients is required in order to provide a composition which can be extruded, partially dried, broken and then fired by continuous tumbling in a rotary kiln without distortion to provide dense non-porous attractively colored chips. The compositions must be capable of firing to a dense vitreous state in the temperature range of 1100° C. to 1350° C. in order to provide attractive colors using known pigments. It has been found important that the composition contain from 40 to 60% by weight clay and from 40 to 60% by weight feldspar. 0 to 20% of a finely divided mineral filler such as finely divided silica can be added if desired without substantially impairing the properties of the composition. Minor amounts of temporary organic binders have been found to give a slight improvement to the extrudability and cohesive properties of the mixtures, but such binders can be omitted, particularly with compositions that contain relatively high percentages of clay.

The invention will be more fully explained with reference to the accompanying drawings in which:

FIG. 1 is a perspective view of a ceramic chip of the present invention;

FIG. 2 is a cross-sectional view taken along line 2—2 of FIG. 1;

FIG. 3 is a perspective view of a terrazzo tile incorporating chips of the present invention;

FIG. 4 is a top plan view of a roofing shingle incorporating the ceramic chips of the present invention;

FIG. 5 is a perspective view of a highway showing the ceramic chips of the present invention applied to a traffic lane dividing strip, and FIG. 6 is an enlarged cross-sectional view of a cut-away portion of the substrate and adhesive coating of the strip of FIG. 5, the cut-away portion showing a side view of a single chip adhered to the substrate.

Referring to the drawings in greater detail, there is shown in FIGS. 1 and 2 a dense fired ceramic chip 1 having generally parallel top and bottom surfaces 2 and 3 and irregular edges 4. Edges 4 and their corners 5 are sharply defined yet the corners 5 are dulled.

In FIG. 3 is shown a terrazzo tile 10 made up of a matrix of rigid, set material 11 and having a plurality of chips 1 embedded in one face thereof. Matrix 11 may be an inorganic cementitious material, such as portland cement, or a settable resinous material, e.g. polyvinyl, polyester, polystyrene, polyurethane, epoxy, para-coumarone-indene, etc.

In FIG. 4 is shown a roofing shingle 20 of conventional design which is formed from felt saturated and coated with asphalt and surfaced on the top side with conventional roofing granules 21. Randomly dispersed over the surface and in direct contact with the coating asphalt are dense ceramic chips 1 of the present invention. Chips 1 can be adhered by pressing the same to insure adhesion to the asphalt.

In the embodiment of FIGS. 5 and 6 is shown a highway 30 having a center line 31 over which are adhered flat dense ceramic chips of the present invention. Pavement 30 may be either asphalt or concrete and the ceramic chips are adhered thereto with an epoxy, epoxy-tar or other adhesive 32. The dense ceramic chips can also be used to cover script or zone markings on road surfaces and provide a very durable soil-resistant surface in any desired color. The chips may be applied to a highway surface by first applying a layer of adhesive 32, and then depositing the chips thereon, for example, by means of a vibratory feeder. The chips may be tamped or rolled to press them into strongly adherent contact with the adhesive. A reflective glass bead containing composition may then be sprayed over the chips. The beads are worn away by vehicular traffic after a time from the tops of chips 1, but the vertical surfaces are protected from such wear. In FIG. 6 are seen reflective glass beads 33 adhered to a vertical surface of a chip 1.

The preferred method of forming the chips of the present invention involves mixing a clay-and-feldspar-containing ceramic composition with water. The combination of clay and organic binder present in the composition must be such that sufficient cohesive strength is imparted to the chips to permit tubing thereof without significant breakage. The extruded material is then preferably dried sufficiently to enable easy fracture thereof. The dried, relatively brittle, yet easily handleable material is then broken up either by the use of an impacting device or by passing through bending rolls, for example, mating rolls one of which has a convex and the other which has a concave surface. The brittle strip of refractory material may be passed through such a fracturing device in a self-supported condition or may be carried by a flexible carrier web. Another suitable fracturing means is a vibrating screen having openings of the desired size on which steel balls are vibrated to assist breakup of the strip. Various fracturing devices other than those mentioned above will be apparent to those skilled in the art. The chips may then be fired to a dense, hard, vitreous condition as hereinafter described.

The clay used in the ceramic composition should contain a major amount of kaolin. As noted above, at least 40% by weight clay should be used in the composition. If less clay is used, the compositions are not readily extrudable.

The other key ingredient to the composition is feldspar, which must be present in an amount forming at least 40% by weight of the formulation in order to achieve dense, well colored rock-like chips at practical firing temperatures in the 1100° C. to 1350° C. range. By "feldspar" as used herein is meant the common forms of potassium, sodium, calcium and barium aluminosilicates, and also the so-called feldspathoids which are similar to the feldspars, but contain less silica. Nepheline syenite, which is composed of albite feldsapar, microcline feldspar, and feldspathoid nepheline is also a useful type of feldspar. The feldspars make possible the use of reasonably low firing temperatures, and since no combined water or other gas-forming ingredients are present, rapid firing without explosion or formation of voids in the chips is achieved.

Examples of temporary organic binders which may be optionally added if desired are metal salts of lignosulfonates. Other similar inexpensive binders will be apparent to those skilled in the art.

The chips of the present invention preferably have large flat surfaces and are very thin, having a thickness of between about 1 mm. and about 5 mm. The average linear dimensions of the surface area, while irregular, due to the irregular shape of the chips, are of such size that the smallest will be retained on a screen having openings of about 4 mm. with the further limitation that the thickness of the majority of the chips is considerably less than the average linear dimensions of the parallel flat surfaces. Chips having an average wide dimension of 2 inches or more which do not distort on firing are possible.

The chips of the present invention have a porosity of less than about 3% and preferably less than about 1% as measured by the standard water absorption test in ASTM C20–46. This low porosity can be produced by firing the chips to a maximum temperature of about 35° C. to 100° C. above the temperature at which the individual chips would stick or fusion bond together if statically fired in contact with each other. At this temperature fusion of a significant fraction of the clay-containing ceramic composition takes place within the chips. It has been found that by causing this high degree of vitrification to take place, a high degree of color can be produced using only very minor amounts, i.e., less than about 1% by weight coloring agents such as chromium oxide. Chips having variegated colors can be formed by alternately feeding different colored compositions to the sheet forming means.

While various moving bed furnaces are suitable for use in the method of the present invention, it is preferred to use a rotary furnace because of the ready adaptability thereof to mass production. A parting agent such as finely divided silica, alumina or magnesia is preferably added when the fusion temperature of the chips is reached to prevent sticking of the chips to the walls of the furnace and to each other.

A further important use for the chips of this invention is as inserts in the formation of monolithic flooring, particularly of the thin-set cured-in-situ type. One method of incorporating the chips in such flooring involves casting a base layer of setable material, for example, an epoxy, vinyl or polyester resin or copolymers thereof, depositing a base layer of settable material, for example, an epoxy, a surfacing material, preferably a transparent settable resin. Where the surface is ground flush with the surface of the chips, it is preferred to use an opaque resin matrix to simulate a grout among the chips. Monolithic terrazzo cementitious floors, walls, and other structures can be formed by casting the cementitious material, and pressing the chips into the surface thereof before the cementitious material has completely set. The chips may be either completely embedded in the substrate, may be flush therewith, or may project slightly therefrom.

The following examples will further illustrate but not limit the invention. All parts are by weight unless otherwise noted.

EXAMPLE I

| | Parts |
|---|---|
| Feldspar (United Clay Mines Lu Spar No. 4, minus 200 mesh) | 50.0 |
| Kaolin (Edgar plastic) | 50.0 |
| Chromium oxide | 0.5 |
| Sodium lignosulphonate | 1.0 |
| Water | 25.0 |

This mixture was extruded through a thin orifice (1.75 mm. x 70 mm.). The strip was cut into convenient lengths of about 45 cm. and oven dried on trays at approximately 150° C. The dry strips were broken by passing them through a pair of rubber rolls in which one of the rolls had a concave configuration and the other roll had a matching convex configuration. Oversized chips which were retained on a screen having about 16 mm. openings were removed and reprocessed as were fines which passed through a screen having about 4 mm. openings. The resulting chips were fired in a rotary gas fired furnace for about 40 minutes to a maximum temperature of 1330° C. This firing temperature was approximately 90° C. above the point at which the chips would stick together if statically fired in contact with each other. Ground silica having particle sizes less than about 0.07 mm. was added to the furnace in an amount equal to about 3% by weight of the chips during the latter part of the firing cycle as a parting agent to further prevent sticking. The chips obtained after cooling were dense, having a water absorption of 0.3%. They had dulled edges on the corners thereof and were pastel green in color. The large surface areas of the chips were generally straight and undistorted by the firing process.

EXAMPLE II

The following composition was processed following the procedures set forth in Example I to form buff colored, flat ceramic chips.

| | Parts |
|---|---|
| Feldspar (United Clay Mines Lu Spar No. 4) | 50.0 |
| Kaolin (Edgar plastic) | 50.0 |
| Buff body stain (Ferro Corp C-402) | 2.0 |
| Pink body stain (Ferro Corp F-1846B) | 2.0 |
| Sodium lignosulphonate | 1.0 |
| Water | 25.0 |

EXAMPLE III

In making very thin, prefinished terrazzo-like tiles using flat ceramic chips embedded in one face of the tiles, warping or distortion of the tiles during curing of the resin matrix material was found to occur. This warping was apparently due to the distribution of chips and resin in the layer near the top side of the tile being different from the distribution of chips and resin in the layer near the bottom side of the tile. The warping caused problems in the subsequent grinding of the tiles and prevented obtaining of a smooth surface when the tiles were installed on a floor or wall.

In accordance with an embodiment of this invention thin terrazzo-like tiles are made which are free of the warping problem. Non-warping tiles are made by arranging flat ceramic chips in a single layer in a polymer matrix which has a thickness approximately that of the chips. The tiles are then ground preferably on both the top and bottom surfaces to a thickness preferably slightly less than the original thickness of the flat ceramic chips, thus providing tiles in which the resin matrix fills all of the spaces among the chips, but there is no resin covering the broad surfaces of the top sides of the flat chips, and only an extremely thin coating, if any, of resin on the back sides of the chips.

A thin film of epoxy resin (H. B. Fuller's No. 7370 Tufflite white epoxy resin) was brushed onto a polytetrafluoroethylene-coated aluminum sheet. Flat ceramic chips of our invention (3 mm. thick, through 26 mm. on 10 mm. screen size) made as in Example I, but which were of variegated color formed by blending compositions having different colors into the extruder, were first arranged into a single layer on a tray. The chips were then carefully transferred from the arranging tray to form a single close-packed layer of chips covering the uncured epoxy film. The sheet supporting the chips on the epoxy resin film was then placed in an oven set at 75° C. for about 15 minutes to partially cure the resin and secure the chips in place. The sheet was then removed from the oven and the spaces between the chips were filled in with the same type of epoxy resin using a steel trowel. The first coating of epoxy resin served as a means for anchoring the chips in position during the grouting operation. The spaces between the chips were filled with the white epoxy resin matrix, but as little epoxy resin as possible was left on the top surfaces of the chips. The chip-epoxy tile cast in this way was allowed to cure at room temperature overnight. It released easily from the sheet and was cut to approximately a 300 mm. square with a diamond saw. The tile was then ground smooth on the top face and rough ground on the back side to a uniform thickness of 2.5 mm. using a stationary head belt grinder. Grinding removed any thin films of epoxy resin applied to either side of the chips during fabrication, exposing the large area outline of each variegated chip. The tile was finally precision ground on the edges to a uniform shape approximately 300 mm. square using a coated abrasive belt grinder. Other resins such as polyesters, polyurethanes, etc., can also be used, epoxy resin being used in this example for purposes of illustration.

What is claimed is:

1. Discrete, fired ceramic chips about 1 to about 5 mm. in thickness and large enough to be retained on a screen having openings of about 4 mm.; said fired chips having been formed essentially from an extruded mixture comprising 40 to 60% by weight clay and 40 to 60% by weight feldspar; said fired chips having less than 3% water absorption, as measured by ASTM test method C20-46; and said fired chips having top and bottom substantially parallel surfaces and irregular, broken edges, said edges having been dulled by tumbling while firing to temperatures ranging from 1100° C.–1350° C.

2. Ceramic chips according to claim 1 wherein said water absorption measured by said test is less than 1%.

3. A substrate having secured to the surface thereof dense fired clay-containing ceramic chips of claim 1, the parallel surfaces of said chips being substantially parallel with said surface of said substrate.

4. The article of claim 3 wherein said surface is a monolithic cured-in-situ structural surface, and said flat chips are embedded therein.

5. The article of claim 4 wherein said article is a terazzo-like tile.

6. The article of claim 3 wherein said substrate is impregnated with asphalt and has roofing granules adhered to one surface thereof.

7. The article of claim 3 wherein said substrate is a highway surface and said chips serve as a traffic regulating marking thereon.

8. A method of forming fired ceramic chips having flat, generally parallel, top and bottom surfaces and irregularly shaped, dulled edges and corners, the water absorption of said chips being less than about 3% when measured in accordance with ASTM test method C20-46, comprising:
 (1) extruding a ceramic composition containing 40 to 60% clay and 40 to 60% feldspar into a leather-like ceramic strip having a thickness between about 1 mm. and about 5 mm.,
 (2) drying said strip to a brittle consistency,
 (3) breaking said strip into frangible, unmatured irregularly shaped chips large enough to be retained on a screen having openings of about 4 mm., and
 (4) firing said unmatured chips, while continuously tumbling said chips in a rotary kiln, to a temperature of at least 1100° C.

9. A method of forming fired ceramic chips having flat, generally parallel, top and bottom surfaces and dulled edges, comprising:
 (1) extruding a plastic ceramic composition containing 40 to 60% by weight clay and 40 to 60% by weight feldspar into a flexible, ceramic strip about 1 to about 5 mm. in thickness,
 (2) drying said strip to a rigid, frangible state.
 (3) breaking said strip into irregularly shaped, unmatured chips, and
 (4) firing said unmatured chips while in motion relative to each other sufficient to prevent inter-chip bonding in a continuously revolving rotary kiln at a temperature between 1100° C. and 1350° C., said firing being carried out long enough to mature said unmatured chips and reduce the porosity thereof to less than 3% water absorption when tested in accordance with ASTM test method C20–46.

References Cited

UNITED STATES PATENTS

| | | | |
|---|---|---|---|
| 1,629,185 | 5/1927 | Tone | 94—5 |
| 1,986,591 | 1/1935 | Meyer | 94—1.5 |
| 2,302,183 | 11/1942 | Burns | 52—554 |
| 2,862,278 | 12/1958 | Engel | 264—11 XR |
| 2,865,266 | 12/1958 | Wynn | 94—1.5 |

JACOB L. NACKENOFF, Primary Examiner

U.S. Cl. X.R.

52—554; 94—1.5; 264—69

UNITED STATES PATENT OFFICE
CERTIFICATE OF CORRECTION

Patent No. 3,512,460          Dated May 19, 1970

Inventor(s) Oakley W. Surine and Henry L. Weisbecker

It is certified that error appears in the above-identified patent and that said Letters Patent are hereby corrected as shown below:

Column 4, line 46, correct the spelling of "setable" to read -- settable -- ; and Column 4, delete line 48, and rewrite it as follows:
-- ing the chips over the base layer, and coating over with -- .

SIGNED AND SEALED

SEP 29 1970

(SEAL)
Attest:

Edward M. Fletcher, Jr.
Attesting Officer

WILLIAM E. SCHUYLER, JR.
Commissioner of Patents